United States Patent [19]

Fay

[11] 4,069,010

[45] Jan. 17, 1978

[54] KILN FOR CERAMIC PRODUCTS

[75] Inventor: Gordon C. Fay, Pittsburgh, Pa.

[73] Assignee: Hendryx Engineers Incorporated, Pittsburgh, Pa.

[21] Appl. No.: 696,824

[22] Filed: June 16, 1976

[51] Int. Cl.² ............................ F27B 9/26; F27B 9/08
[52] U.S. Cl. .................................... 432/137; 432/149; 432/153
[58] Field of Search ................. 432/137, 146, 149, 153

[56] References Cited

U.S. PATENT DOCUMENTS

| 1,657,138 | 1/1928 | Straight | 432/137 |
| 1,662,912 | 3/1928 | Wilson et al. | 432/137 |
| 1,663,029 | 3/1928 | Straight | 432/137 |
| 3,219,328 | 11/1965 | Miller | 432/137 |
| 3,854,865 | 12/1974 | Fay | 432/146 |

Primary Examiner—John J. Camby
Attorney, Agent, or Firm—F. P. Lyle

[57] ABSTRACT

A kiln of relatively simple design and low-cost construction is provided for firing ceramic ware. The kiln is of the shuttle type consisting generally of a rectangular enclosing structure with a movable floor which may consist of cars for supporting the ware. Burners are located along the lower part of each side wall and provided with air in excess of that required for combustion to produce high velocity streams of hot gas flowing vertically upward along the inside of the walls. The hot gas is redirected downward to flow through the ware and exhausted below the ware into horizontal flues on each side of the kiln from which gas is aspirated into the high velocity vertical gas streams for recirculation.

2 Claims, 2 Drawing Figures

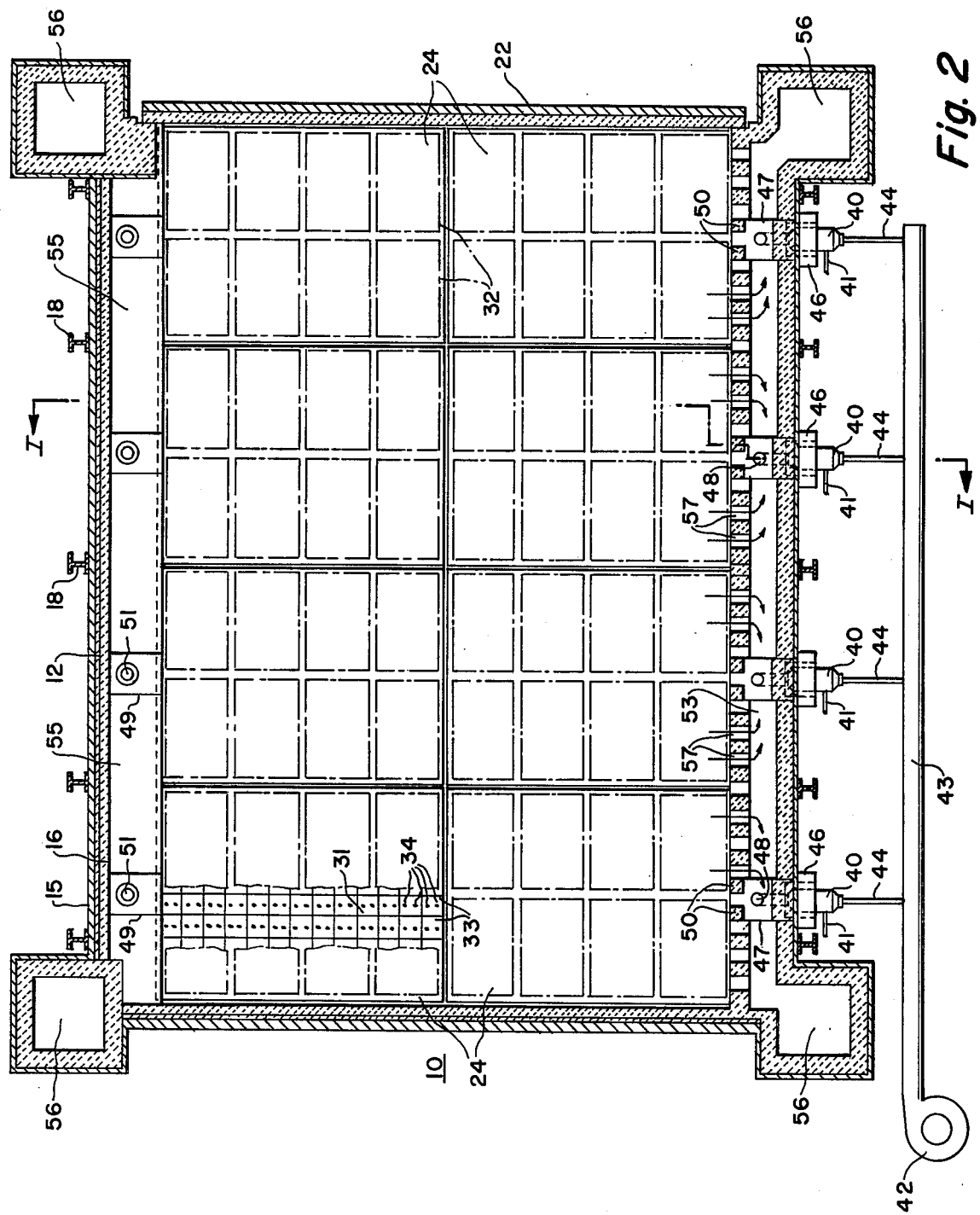

KILN FOR CERAMIC PRODUCTS

BACKGROUND OF THE INVENTION

The present invention relates to kilns for firing ceramic products such as brick, sewer pipe, refractories and the like.

In the manufacture of such ceramic products, it is necessary to fire the molded clay ware in a kiln at high temperature for a substantial period of time. Several types of kilns have been used for this purpose. The type of kiln known as a shuttle kiln consists generally of a rectangular refractory enclosure provided with burners for heating the ware which is stacked on cars for movement into and out of the kiln. Kilns of this type have the great advantage of flexibility in use but in the past have had the disadvantages of high capital cost and high fuel costs as compared to other types of kilns. This was due primarily to the usual construction of such kilns in which the hot gases from the burners flowed upward through the ware and were exhausted at the top, making only a single pass over the ware, so that large amounts of heat were wasted and the fuel costs were correspondingly high. Earlier attempts at building kilns for downdraft operation, in which the gases flow downwards through the ware, involved quite complicated and expensive constructions and such kilns were not widely used.

In my U.S. Pat. No. 3,854,865, there is disclosed a new type of shuttle kiln of relatively simple design which uses downdraft gas flow with recirculation and can be operated at low fuel cost. The kiln of this prior patent consists of a generally rectangular refractory enclosure with a movable floor consisting of one or more cars for supporting the ware and moving it into and out of the kiln. Burners are provided in the upper part of the kiln which are supplied with excess air to provide large volumes of high velocity heated gas in the top of the kiln which is directed to flow downward through the ware. The gas exhausts laterally through the floor of the kiln into a system of ducts in the side walls which direct the gas upward toward the burners. The gas is there aspirated into the gas flow from the burners and mixes therewith for recirculation through the kiln. A very effective downdraft gas flow is thus obtained which results in relatively low fuel cost. This prior construction, however, requires essentially double walls to provide the necessary ducts and flues for circulation of the gas, and thus involves a relatively large amount of brickwork with attendant high cost.

SUMMARY OF THE INVENTION

The present invention provides an improved shuttle kiln of the same general type as that of the above-mentioned prior patent but which is of simpler and less expensive construction, and can easily be adapted for lower temperature operation.

More specifically, the new kiln consists of a generally rectangular refractory enclosure with a movable floor which, as before, may consist of cars on which the ware is supported for movement into and out of the kiln. In the new kiln, however, the burners are placed in the side walls near the bottom of each wall to provide streams of hot gas flowing vertically upward close to the walls. The burners can be supplied with air in excess of that required for combustion to produce high velocity gas streams which flow upward and are redirected by the furnace roof to flow down through the ware. The gas then flows through the floor into passages or ducts in the cars and is exhausted laterally toward the kiln walls. A horizontal flue extends along each side wall between the burners and is provided with ports to receive the gas exhausted from the cars. These flues serve as ducts to direct the gas along the walls to the burners, and the gas is there aspirated into the high velocity gas streams to be again carried upward for recirculation through the kiln. In this way, a kiln is provided which does not require elaborate systems of ducts in the side walls and minimizes the amount of expensive brickwork required, as well as being adaptable to lower temperature construction which substantially eliminates brickwork. The size and capital cost of the kiln are thus reduced while the performance and other advantages are essentially the same as those of the kiln of the prior patent.

BRIEF DESCRIPTION OF THE DRAWINGS

The invention will be more fully understood from the following detailed description, taken in connection with the accompanying drawings, in which:

FIG. 2 is a horizontal sectional view substantially on the line II—II of FIG. 1.

DESCRIPTION OF THE PREFERRED EMBODIMENT

Figure 1:
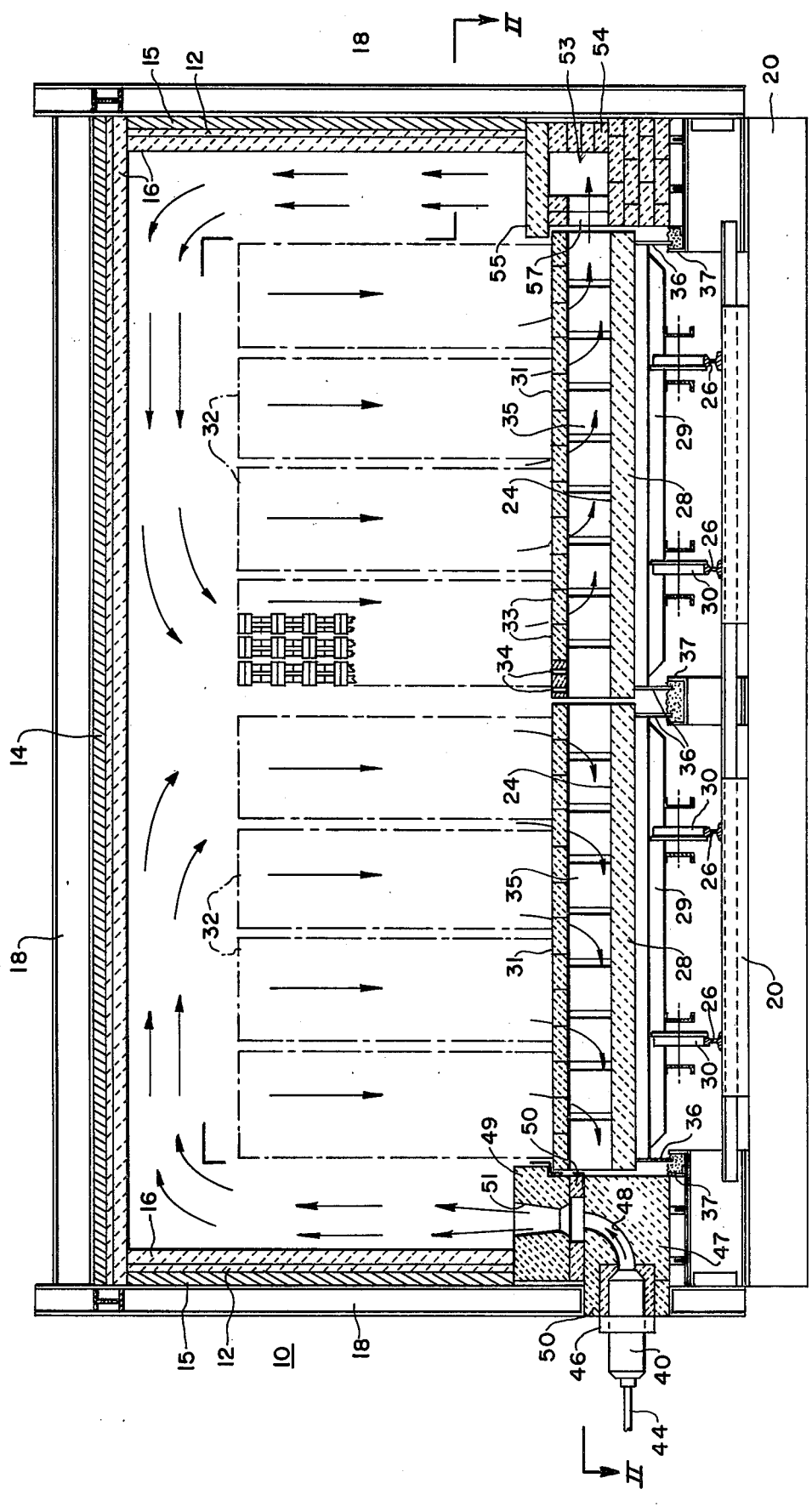
FIG. 1 is a transverse sectional view of a kiln embodying the invention substantially on the line I—I of FIG. 2.

An illustrative embodiment of the invention is shown in the drawings. As there shown, the kiln 10 may comprise a generally rectangular enclosure having side walls 12 and a roof 14. The kiln 10 is intended for somewhat lower temperature operation than that of the prior patent, in the range of 2000° to 2300° F, for example, and the walls and roof may, therefore, consist of outer steel plates 15 lined with blankets or layers of fibrous thermal insulation 16. It will be understood, of course, that for higher temperatures, the kiln 10 may be built of refractory brick, or any suitable or desired type of construction may be used. The walls 12 and roof 14 are supported in a structural steel framework 18, of any suitable or usual type, and the entire kiln is supported on a framework of structural steel members 20 arranged in any usual configuration. In the embodiment shown in the drawings, the kiln is permanently closed at one end and is closed at the other end by a door 22 of generally similar construction to that of the walls, and which may be of any suitable or usual type which is capable of being tightly sealed in place when the kiln is in operation. Doors may, of course, be provided at both ends is desired.

The bottom of the kiln is closed by movable floor means which preferably takes the form of cars 24 movable in and out of the kiln on rails 26 supported on the members 20. Two parallel tracks are shown in the drawings for two sets of cars, but it will be understood that a single track, or any necessary number of tracks, might be utilized as required by the desired capacity of the kiln. The cars 24 are preferably of the same construction as the cars shown in the prior patent mentioned above. As there more fully described, each of the cars has an impervious base 28 of refractory material carried on a framework 29 which is supported on wheels 30 adapted to run on the rails 26. Each car has an upper surface 31 on which the ware 32 to be fired is stacked. The ware may be any desired ceramic product including brick, sewer pipe, refractories and other structural clay products, and may be stacked in the manner illustrated in the drawings to permit free flow of hot gases through the ware. The ware 32 is illustrated as being brick but other types of ceramic ware may be similarly stacked. The floor of the kiln is formed by the top surfaces 31 of the cars 24, adjacent cars on the same track being sealed together at their ends with seals of usual type. The top surfaces of the cars are formed by refractory blocks 33 having openings 34 through which gas may flow. The blocks 33 are supported on the impervious base 28 by means of spacer blocks which form lateral ducts 35 through which gas may exhaust laterally of the car. The car construction has not been illustrated in detail since the cars are preferably of the construction described in the prior patent, although any suitable means could be utilized to provide a floor structure through which downwardly-flowing gas can pass and which includes ducts through which the gas can flow laterally. A downwardly-extending flange 36 is provided on each side of each car extending into a stationary channel 37 which can be used to form a conventional sand seal so that the bottom of the kiln is sealed against escape of the hot gases.

The kiln is heated by a plurality of burners 40 which are placed near the bottom of each of the side walls 12 and spaced apart as shown in FIG. 2 so as to be distributed substantially uniformly from one end of the kiln to the other, the spacing being such that reasonably uniform heating is obtained with a reasonable number of burners. The burners 40 may be of any suitable type and may be either gas or oil fired or may utilize any other desired fuel, the fuel being supplied to each burner through a fuel line 41. The burners 40 are of a type which can be operated with excess air, and may be supplied with a quantity of air in excess of that actually required for complete combustion of the fuel. For this purpose, an air supply is provided consisting of a blower 42 and an air header 43, each burner being connected to header 43 by an air line 44 to supply the required volume of air at the desired pressure. It will be understood that any suitable or desired type of air supply system may be provided, the header 43 representing any such supply. A similar header is, of course, provided on the opposite side of the kiln for the burners on that side.

Each of the burners 40 includes a refractory block 46 mounted in a burner block 47. The blocks 46 and 47 are built into the wall 12 as shown near the bottom of the wall, and the several burners 40 are spaced apart along each wall as shown in FIG. 2. Each block 47 has a curved passage 48 which directs the flow of hot combustion gases from the burner into a vertically upward direction. A Venturi block 49 of refractory material is associated with each burner and is placed adjacent the burner block 47 but vertically spaced from it by refractory spacer members 50 as shown. The block 49 has a Venturi passage 51 formed in it which is disposed in substantial alignment with the exit of the gas passage 48. The hot combustion gases coming from each burner 40, therefore, are directed by the passage 48 to the Venturi passage 51 and discharged therefrom in a vertically upward moving stream of hot gases at very high velocity, which is high enough to entrain kiln atmosphere gases for reheating and recirculation. These streams of hot gases strike the roof 14 of the kiln and are redirected thereby to flow downward through the ware 32 on the cars 24 to heat the ware uniformly to the desired temperature. The gas thus flowing downward passes through the floor 31 on which the ware is stacked and into the lateral ducts 35.

Duct means are provided on each side of the kiln for receiving the gases exhausted through the ducts 35. As shown in the drawings, the duct means takes the form of a horizontal flue 53 extending along each side of the kiln near the bottom of the wall 12. Each flue 53 may be built of refractory brick 54 and slabs 55 to form a longitudinal passage extending from one end to the other of the kiln on each side and communicating with a stack 56 at each end. A plurality of ports 57 are provided in each of the flues 53 and positioned to be substantially in horizontal alignment with the lateral ducts 35 in the cars 24. The flues 53 extend horizontally between the burners and are partially blocked by the burner blocks 47 and spacers 50, but the spaces between the blocks 47 and 49 are open so that gas can flow freely into these spaces, and the flues are relatively unobstructed so that gas can flow continuously throughout the length of the flues.

In the operation of the kiln 10, the burners 40 are operated as described above to produce high velocity streams of gas flowing vertically upward, the circulation of gas in the kiln being shown by the arrows in the drawing. The upwardly-flowing gas streams are redirected by the roof 14 to flow downwardly through the ware to heat the ware uniformly to the desired firing temperature. The gas passing through the ware flows through the openings 34 in the floor 31 and into the ducts 35 through which it is exhausted laterally to each side of the kiln. The gas thus discharged from the cars is received through the ports 57 into the flues 53 on each side of the kiln and flows in both directions in the flue. The gas thus flows through the flues to the nearest burner and into the space between the associated blocks 47 and 49. The Venturi effect of the passage 51, together with the high velocity of the gas stream from the burner, cause the major part of the gas from the flue to be aspirated into the passage 51 and mixed with the hot combustion gas coming from the burner. The gas is thus recirculated and is reheated by the hot gas from the burner so that a large volume of heated gas is continuously recirculated through the ware to raise it to the desired temperature in the minimum time and to maintain it at this temperature for the necessary length of time. The use of excess air burners permits a large volume of gas to be used when desired to insure effective recirculation as described and to produce a higher velocity gas stream from the burners. The velocity of the gas stream should be high enough to insure that a large proportion of the gas flowing in the flue 53 will be entrained in the hot gas stream to provide the necessary motive force to carry the large volume of gas upwardly. A typical velocity would be 20,000 feet per minute, for example, which is high enough to insure operation in the manner described, although any suitable velocity which is high enough could be used.

It should now be apparent that a kiln has been provided for firing ceramic products which has many advantages. The new kiln provides for downdraft operation in a manner to positively insure uniform heating of the ware by a large volume of recirculating heated gas. The operation is thus similar to that of the prior patent referred to above and has all the advantages of the prior construction. The new kiln, however, has the further advantage of relatively low-cost construction since no elaborate duct system is required in the walls and the necessary brickwork is greatly reduced. The kiln is readily adaptable to low-cost construction for lower temperature operation and an economical kiln is thus provided which reduces the cost without losing any of the advantages of the earlier construction.

I claim as my invention:

1. A kiln for firing ceramic ware comprising an enclosing structure having side walls and a roof, movable floor means for supporting the ware within the enclosing structure, said floor means being adapted to permit gas to flow downward therethrough and including means for exhausting gas laterally below the level of the floor, a flue extending longitudinally of the kiln along each side wall near the bottom thereof, each flue having a plurality of ports therein in position to receive gas exhausted from said floor means, whereby said gas flows longitudinally in said flue, a plurality of burners spaced apart along each side wall near the bottom thereof, said burners being the sole source of heat in the kiln, each burner including means for directing a stream of hot gas vertically upward in the kiln adjacent the side wall, a refractory block associated with each burner having a vertical Venturi passage therein positioned to receive the stream of hot gas from the burner, the burners and associated blocks being disposed in the flues at spaced intervals and each burner and its associated block being vertically spaced apart to permit gas in the flue to flow between them, and external means for supplying air to said burners in excess of the amount required for combustion to induce a high velocity stream of gas from each burner such that a major portion of the gas flowing in the adjacent flue is entrained in said stream to sustain a high velocity upward flow of a large volume of gas, said gas being redirected by the roof of the kiln to flow downward through the ware.

2. A kiln as defined in claim 1 in which the velocity of said gas stream is of the order of 20,000 feet per minute.

* * * * *